United States Patent Office 3,512,919
Patented May 19, 1970

3,512,919
DIGLYCIDYL GLYCOL TREATMENT OF POLYACRYLONITRILE OR POLYVINYL CHLORIDE WITH POLYALKYLENEIMINE DISPERSED THEREIN
Vittorio Cappuccio, Terni, and Ubaldo Riboni, Milan, Italy, assignors to Montecatini Edison S.p.A., Milan, Italy
No Drawing. Continuation-in-part of application Ser. No. 401,670, Oct. 5, 1964, which is a continuation of application Ser. No. 23,129, Apr. 19, 1960. This application Sept. 28, 1966, Ser. No. 582,530
Claims priority, application Italy, Apr. 21, 1959, 6,635/59, Patent 628,251
Int. Cl. C09b 65/00
U.S. Cl. 8—100                                        1 Claim

ABSTRACT OF THE DISCLOSURE

Fibers made from polymers or copolymers of acrylonitrile, vinylchloride, or methyl methacrylate and cellulose acetate, with polyalkyleneimines dispersed in these resin are treated, before or after stretching, with diepoxides such as diepoxy butane, diglycidyl -methane, -ethane, or -propane, diglycidyl ethers of methylene, ethylene or propylene glycol and the diglycidyl ethers of 1,4-dihydroxy-benzene or di-hydroxy-diphenyl-dimethyl methane. The receptivity to acid, metallized, chromium, vat and acetate dyes such as C.I. No. 2364 and C.I. No. 1248 is increased. The hand of the fabric is also improved.

---

This application is a continuation-in-part of copending application No. 401,670, filed Oct. 5, 1964 and now abandoned, which is a continuation of Ser. No. 23,129, filed Apr. 19, 1960 and now abandoned.

The present invention relates to an improvement in the tinctorial characteristics of fibers obtained from mixtures of synthetic polymers with amine or imine compounds.

More particularly, it relates to the treatment of such fibers with an epoxy compound.

In U.S. Patent No. 3,037,835, there is described a process for preparing textile fibers having a good receptivity to dyes, particularly to acid dyes. These fibers are made from polymers or copolymers of acrylonitrile, vinyl chloride, methyl methacrylate and cellulose acetate, which polymers or copolymers are mixed with amines or imines such as polyalkyleneimines or with epoxy resins. The fibers obtained from these mixtures offer a good receptivity to dyes. However, the basic compounds, i.e., amines or imines, which are mixed with the polymer or copolymer tend to separate out from the mixture, so that the resulting fiber does not retain its good dyeability.

It has been proposed to insolubilize polyalkyleneimines present in the fibers by treating the fibers with formaldehyde, with oxidants, or with isocyanates. However, these treatments have not been entirely satisfactory, because no substantial improvement of the characteristics of dyeability and of the colour fastness is thereby obtained.

Accordingly, it is an object of this invention to provide a method of making dye-receptive fibers.

Another object is to provide a method of treating a mixture of a synthetic resin and a basic nitrogen compound to insolubilize the basic nitrogen compound and prevent it from separating out from the mixture.

Additional objects will become apparent hereinafter.

We have now found, in accordance with one aspect of our invention, that the separation of the polyalkyleneimine or other basic nitrogen compound incorporated in the polymer can be prevented by treating the fibers with certain epoxy compounds.

Epoxy compounds which are suitable for the practice of our invention may be represented by the following formula:

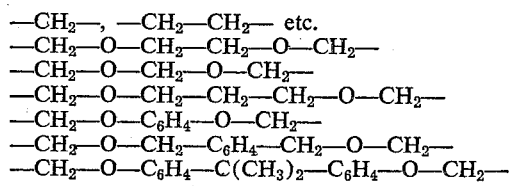

where $n$ is zero or one and A is an aliphatic or aromatic radical which may or may not contain oxygen.

Typical examples of suitable divalent A radicals include methylene, ethylene, propylene, phenylene and groups of the type:

—CH$_2$—, —CH$_2$—CH$_2$— etc.
—CH$_2$—O—CH$_2$—CH$_2$—O—CH$_2$—
—CH$_2$—O—CH$_2$—O—CH$_2$—
—CH$_2$—O—CH$_2$—CH$_2$—CH$_2$—O—CH$_2$—
—CH$_2$—O—C$_6$H$_4$—O—CH$_2$—
—CH$_2$—O—CH$_2$—C$_6$H$_4$—CH$_2$—O—CH$_2$—
—CH$_2$—O—C$_6$H$_4$—C(CH$_3$)$_2$—C$_6$H$_4$—O—CH$_2$—

Suitable epoxy compounds according to the invention, are diepoxy butane, diglycidyl derivatives of methane, ethane, propane and the like, diglycidylether of methylene glycol, ethylene glycol, propylene glycol and the like, diglycidylether of 1,4-dihydroxy-benzene-4,4'-dihydroxy-diphenyl-dimethylmethane and the like.

Epoxy compounds represented by the above formula will react with the basic nitrogen groups, e.g., amino or imino groups, present in the fiber, thereby rendering them insoluble and preventing their separating out.

The insolubilization of the basic nitrogen compounds mixed with the polymer or copolymer seems to derive from a double action caused by the epoxy treatment of the fibers. The treatment seems to correspond to a fiber sizing. Also, it seems that a portion of the epoxide polymerizes, thereby forming a protective film on the outer surface of the fiber. Indeed, the epoxy compound appears to function as a cross-linker.

The advantage of this method lies in the fact that, by subjecting the fibers to our epoxy treatment we succeed not only in avoiding the separation of the polyalkyleneimine (or other basic nitrogen compound), which separation causes a decrease in the dyeability of the fibers and a certain greasiness of the manufactured articles, but also in increasing the receptivity to dyes (acid dyes, metallized dyes, chromium dyes, vat dyes and acetate dyes), remarkably improving the "hand" of the treated fibers and substantially increasing the color fastness.

The various types of basic nitrogen compounds, e.g., polyalkyleneimines, suitable for mixing with the synthetic resin are more fully set out in the abovementioned U.S. Pat. No. 3,037,835. We generally refer to such basic nitrogen compound as a modified or a tinctorial modifier.

In accordance with another aspect of our invention, we have found that if the epoxy treatment is carried out in an organic solvent in which the tinctorial modifier is either insoluble or less soluble than it is in water, an even greater improvement in the dye-receptivity of the fiber is obtained.

The epoxy compound, e.g., a di-epoxy hydrocarbon, ethylene glycol diglycidyl ether, may be dissolved in a solvent which also will exert a certain swelling or dissolving action on the fibers. This permits better penetration of the epoxy compound into the fiber and a more complete utilization of the nitrogen-base modifier contained in the yarn.

Accordingly, a further aspect of this invention is the use of organic solvents such as, e.g., aliphatic hydrocarbons, substituted derivatives thereof, alcohols, esters, ethers, etc., which exhibit the aforementioned properties.

The application of the epoxy compound may be carried out either before or after stretching of the fibers, for a time varying from a few seconds to 2 or 3 hours, at temperatures varying from room temperature to 10° C. below the softening point of the polymers. The epoxy compound may be applied in solution, as a dispersion in water or in organic solvent, or in the anhydrous state.

The dyeing with acid or metallized dyes were carried out in the presence of 3% of ammonium acetate (by weight of the fiber) and of 1% of a surface active agent consisting of the condensation produce of ethylene oxide with an alkyl phenol (p-tert.-octyl-phenol). Thirty minutes after the beginning of boiling, 0.2% of glacial acetic acid (by weight of the fiber) was added in order to improve the bath exhaustion. The dyeing with disperse dyes was carried out in the presence of 2% (by weight of the fiber) of a surface-active compound. The fibres after dyeing were rinsed with running water.

The following examples will further illustrate our invention. All parts are by weight unless otherwise indicated.

EXAMPLE 1

A yarn was prepared by mixing 950 g. polyacrylonitrile (molecular weight 70,000) with 50 g. polyethyleneimine treated with hydrogen peroxide and neutralized with acetic acid in 3000 g. dimethylformamide. The yarn was stretched with a stretching ratio of 1:4.5 and then cut into a staple (length 10 cm.). It was then subjected to a treatment for 15 minutes at 90° C. with a 10% aqueous solution of ethylene glycol diglycidyl ether,

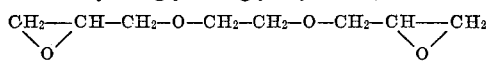

followed by washing with water and drying. The fibers obtained gave very intense and solid colors with the following acid dyes:

Solid Yellow 2G (Color Index No. 2364)
Wool Red B
Alizarine Blue SE (Color Index No. 1248)

EXAMPLE 2

A yarn was prepared by mixing 950 g. polyvinyl chloride, having a Fikentscher's K value of 65, with 50 g. polyethyleneimine treated with hydrogen peroxide, in 5060 g. of an 80/20 trichloroethylene-nitromethane mixture.

This yarn was stretched with a stretching ratio of 1:4. It was then subjected to a treatment with a 10% aqueous solution of ethylene glycol diglycidyl ether at 80° C. for 20 minutes. The yarn was then washed and dried. The fibers obtained gave very intense and solid colors with the following acid dyes:

Solid Yellow 2G
Wool Red B
Alizarine Blue SE

EXAMPLE 3

A yarn was prepared by wet-spinning of a mix consisting of 950 g. polyacrylonitrile (molecular weight 70,000), 50 g. polyethyleneimine and 3000 g. dimethylformamide. The yarn was stretched at 120° C. with a stretching ratio of 1:4; it was then subjected to a treatment for 2 minutes at 25° C. with a 5% aqueous solution of ethylene-glycol-diglycidylether, followed by treating for 5 minutes at 160° C., washing with water and drying. The fibres obtained gave very intense colors with the following acid dyes:

Wool Red B
Alizarine Blue BV.

The colors obtained with the aforementioned dyes present a fastness to perspiration and washing A of 5, determined according to the Internation Fastness Code (Color-Index).

Variations can, of course, be made without departing from the spirit of our invention. Having thus described our invention what we desire to secure by Letters Patent and hereby claim is:

1. A process comprising contacting a stretched or unstretched polyacrylonitrile or polyvinylchloride fiber containing a polyalkyleneimine with an epoxy compound of the formula

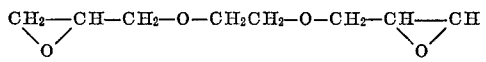

whereby the dye receptivity of said fibers is increased.

References Cited

UNITED STATES PATENTS 2,131,121  9/1938  Schlack _____ 8—74
2,261,294  11/1941 Schlack _____ 8—94.33

DONALD LEVY, Primary Examiner

U.S. Cl. X.R.

8—34, 62, 168, 177, 115.6, 115.5, 31, 165, 42; 117—139.5; 260—884, 898, 887, 928; 264—78

UNITED STATES PATENT OFFICE
CERTIFICATE OF CORRECTION

Patent No. 3,512,919   Dated May 19, 1970

Inventor(s) Vittorio Cappuccio and Ubaldo Riboni

It is certified that error appears in the above-identified patent and that said Letters Patent are hereby corrected as shown below:

Column 4, the formula in claim 1 should read

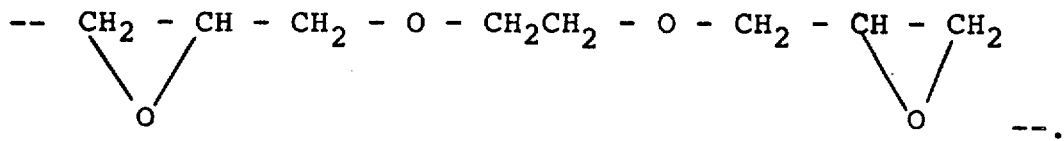

SIGNED AND SEALED
SEP 29 1970

(SEAL)
Attest:

Edward M. Fletcher, Jr.
Attesting Officer

WILLIAM E. SCHUYLER, JR.
Commissioner of Patents